United States Patent [19]

Magnusson et al.

[11] Patent Number: 4,517,646
[45] Date of Patent: May 14, 1985

[54] METHOD OF AUTOMATIC GEAR SELECTION IN A VEHICLE POWER TRANSMISSION

[75] Inventors: Karl G. Magnusson, Handen; Hans V. Ståhl, Södertälje, both of Sweden

[73] Assignee: Saab-Scania Aktiebolag, Sweden

[21] Appl. No.: 403,614

[22] PCT Filed: Nov. 19, 1981

[86] PCT No.: PCT/SE81/00337
§ 371 Date: Jul. 27, 1982
§ 102(e) Date: Jul. 27, 1982

[87] PCT Pub. No.: WO82/01853
PCT Pub. Date: Jun. 10, 1982

[30] Foreign Application Priority Data

Nov. 28, 1980 [SE] Sweden ............................... 8008401

[51] Int. Cl.³ .................... B60K 20/16; G05D 17/02; F16H 5/66
[52] U.S. Cl. ................................. 364/424.1; 74/866
[58] Field of Search ....................... 364/424.1; 74/866

[56] References Cited

U.S. PATENT DOCUMENTS

| | | | |
|---|---|---|---|
| 4,262,335 | 4/1981 | Ahlen et al. | 74/866 |
| 4,285,252 | 8/1981 | Yamaki et al. | 74/866 |
| 4,335,428 | 6/1982 | Miki et al. | 364/424.1 |
| 4,338,666 | 7/1982 | Suzuki et al. | 364/424.1 |
| 4,361,060 | 11/1982 | Smyth | 364/424.1 |
| 4,380,048 | 4/1983 | Kishi et al. | 364/424.1 |
| 4,412,290 | 10/1983 | Pannier | 364/424.1 |
| 4,467,427 | 8/1984 | Magnusson | 364/424.1 |

FOREIGN PATENT DOCUMENTS 1462957 1/1977 United Kingdom ............ 364/424.1

Primary Examiner—Felix D. Gruber
Attorney, Agent, or Firm—Ostrolenk, Faber, Gerb & Soffen

[57] ABSTRACT

Method for automatic gear selection in a vehicle power transmission, said selection being catered for by a control system including an electronic unit (1) which, in response to signals representing vehicle speed and engine load, coacts with a programmable read-only memory PROM (28), in which there are stored, for each gear position, alternative speed limits for changing gear to neighboring gears and also limiting values relating to speed change and engine load for selection between said alternative speed limits. To eliminate the risk of unsuitable gear selection for heavy vehicles, e.g. in conjunction with changing gear on a hill, the invention is essentially distinguished in that during travel, data on speed change and engine load are stored in a random access memory RAM (29); that the speed value most recently stored in said RAM before the initiation of the gear selection is compared, together with values stored in said RAM and relating to speed change and engine load at a certain instant before the initiation of the speed change, with values stored in said PROM and relating to speed, speed change and engine load, respectively; that said comparison results in the choice of a certain gear; that in the electronic unit (1) there is generated an output signal representing the selected gear; and that said output signal is fed to an operative means for indicating and/or engaging the selected gear.

12 Claims, 5 Drawing Figures

_4,517,646_

METHOD OF AUTOMATIC GEAR SELECTION IN A VEHICLE POWER TRANSMISSION

BACKGROUND AND SUMMARY OF THE INVENTION

The present invention relates to a method of automatic gear selection in a vehicle power transmission, the gear selection being carried out by a control system including an electronic unit which, in response to signals representing vehicle speed and engine load, coacts with a read-only memory (preferably a PROM) in which there are stored, for each gear position, alternative sets of speed limits for changing gear to neighboring gear. Which set of speed limits will be used to cause the gear to change is determined by limiting values relating to speed change (acceleration or deceleration) and engine load.

Arrangements for automatic gear selection are already known, but such systems are primarily intended for automatic gearboxes with a hydraulic torque converter. In automatic gear selection systems for purely mechanical transmissions, where gear changing is first enabled after the main clutch has interrupted the torque connection in the engine, problems often arise in obtaining a correct gear selection, e.g. when changing gear on a hill. Particularly with heavy vehicles, it is necessary that control of the engine load be accurately synchronized with the main clutch at the beginning of a gear changing process. In the absence of such synchronization, the vehicle may be subjected to an appreciable change in speed before the torque connection is completely interrupted. Such a change in speed could cause signals fed into the gear selection system to bring out the selection of an unnecessarily low gear, which can be troublesome for the driver, and furthermore affect traffic rhythm negatively.

The present invention has the task of providing a gear selection system where the risk of unsuitable gear selection has been eliminated. The invention is distinguished in that during travel, data on speed change (acceleration or deceleration—hereinafter referred to simply as acceleration) and engine load are stored in a random access memory (RAM); that the speed value most recently stored in said RAM before the initiation of the gear selection is compared, together with values stored in said RAM and relating to acceleration and engine load at a predetermined time period prior to the initiation of the speed change, with values stored in said PROM and relating to speed, acceleration and engine load, respectively; that said comparison results in the choice of a certain gear; and that in the electronic unit there is generated an output signal representing the selected gear.

In the inventive method, the input signals generated in the gear selection system immediately prior to the initiation of the gear selection process are not used for selecting a gear. There are thus avoided undesirable variations in the input signals, which could possibly occur immediately prior to the initiation of the gear change process.

In an advantageous embodiment of the invention, values for acceleration and engine load relating to an instant at least 0.5 seconds before the initiation of gear selection are used in the gear selection process.

BRIEF DESCRIPTION OF THE DRAWINGS

Other distinguishing features characterizing the invention will be apparent from the description below and the following patent claims. The description is made with reference to the appended drawings, where FIG. 1 schematically illustrates a system for automatic gear selection, FIG. 2 similarly illustrates a unit included in the system according to FIG. 1.

DETAILED DESCRIPTION OF THE INVENTION

The exemplified arrangement is primarily intended for application in an automatic gear selection system for heavy vehicles, the selected gear being engaged in a gear change process initiated manually by the driver. A conventional mechanical transmission with a main clutch between engine and gearbox can thus be retained unchanged, which means that the comparatively high efficiency of the transmission can also be utilized. In an advantageous implementation of the gear selection system of the present invention, the automatic gear selection may be disengaged to enable a purely manual gear selection. The system also permits manual selection of a gear even when the automatic gear selection system is engaged. After manual selection of a gear which is different than the gear selected by the automatic gear selection system, the driver has a certain time, ten seconds for example, to initiate the gear changing process. The initiation may, for example, take place by the clutch being depressed, the system then sensing the movement and thereafter automatically taking care of the gear change. When the gear change is completed, this is indicated to the drive by a buzzer and/or an indication lamp, whereupon the driver can again engage the clutch. The system is thereafter prepared for a new gear selection.

Figure 1:
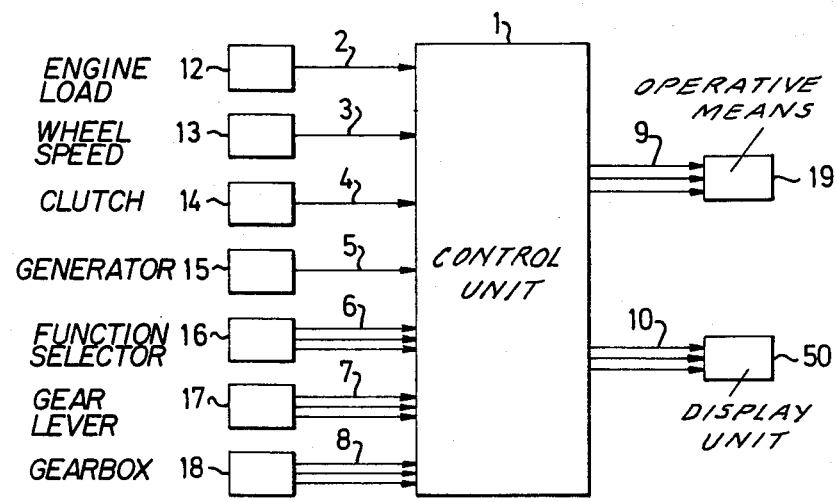

The gear selection in question operates with input signals which relate to a number of parameters which are schematically illustrated in FIG. 1. A load signal representing the engine load is thus fed to a control unit 1 via a line 2. With an engine equipped with supercharging, the load signal is suitably proportional to the boost pressure in the engine induction system 12. In an alternate application, the position of the vehicle accelerator pedal may constitute a measure of the engine load. Via a line 3 there is fed to the control unit 1 a signal corresponding to the speed of a vehicle wheel, which in most cases is proportional to the speed of the vehicle. In practice, it is suitable to sense the r.p.m. of the gearbox output shaft 13. A signal responsive to the position of a clutch 14 between engine and gearbox and operable by the driver is applied to the control unit 1 via a line 4. A signal is also applied to the control unit 1 via a line 5, the latter signal being responsive to whether or not the engine is running. The latter state is suitably sensed at the generator 15 conventionally connected to the engine. The input signal located on a plurality of parallel input lines (hereinafter referred to as a line bunch) 6 represents the position of a function selector 16 operable by the driver and which includes the four following alternative positions: a first position relating to driving with manual gear selection, a second position relating to driving with automatic gear selection (and manual override), a third position relating to selection of neutral gear, and a fourth position relating to selection of reverse gear. Signals from a manually operable gear lever 17 are fed to the control unit 1 via a line bunch 7, and via a line bunch 8 signals representing the state of the gearbox 18, i.e. if a gear is engaged and, if so, which one.

In response to the foregoing input signals, the control unit 1 generates output signals which are fed via a line bunch 9 to operative means 19 for executing the gear change, e.g. to a number of solenoid valves controlling compressed air or pressurized hydraulic oil to a number of cylinder units executing the gear change movements. Output signals are also fed via a line bunch 10 to a display unit 50 having a buzzer or similar means for notifying the driver of the gear selection, the gear change completion or whether errors have occured in the control system.

Figure 2:
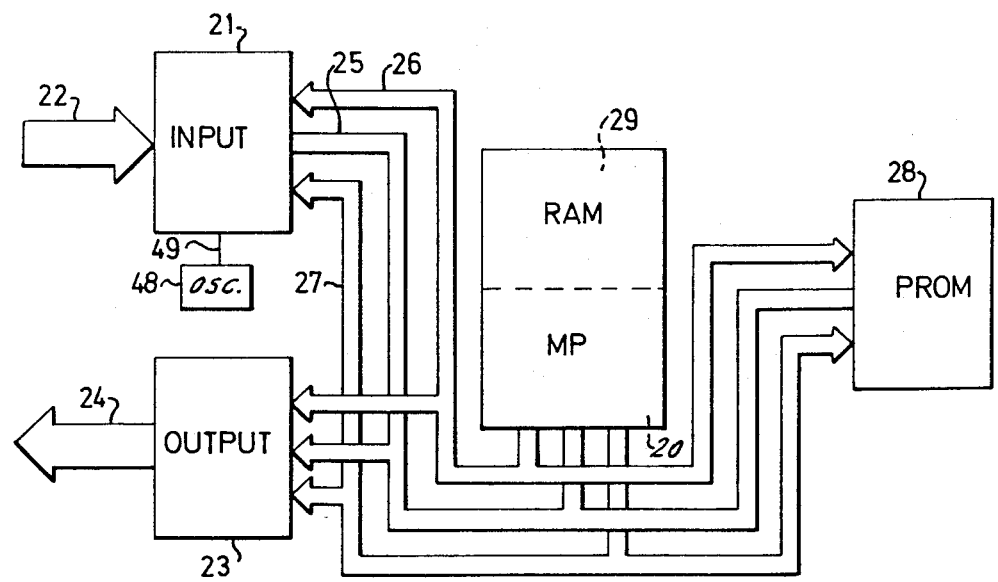

The heart of control unit 1 illustrated in FIG. 2 is a microprocessor 20 which, in a manner known per se, via a number of input circuits 21 is conventionally fed with input signals via the lines 2, here represented by a line bunch 22. Output circuits 23 adjust the control unit's signals on the line bunches 9, 10, here represented by a line bunch 24, to what is required for actuation of the operative means 19 and the display/buzzer unit 50. In the input and output circuits 21, 23 there are also protective circuits which protect the microprocessor 20 against signals disturbing its function. The output circuits 23 also include an amplifier which amplifies the output signal of the control unit 1 to a level required to actuate the solenoid valves.

Via data lines, address lines and control lines (i.e. data bus 25, address bus 26 and control bus 27, respectively), the microprocessor 20 coacts in a manner known per se in the microprocessor art with the input and output circuits 21, 23 as well as with an external programmable read-only memory denoted PROM 28, and a random access memory denoted RAM 29, built into the microprocessor 20. This is the case, for example, if the microprocessor 20 is of the 6802 type (e.g. made by Motorola), which type has been found advantageous in applying the present invention.

The control unit 1 there is also included a low-frequency oscillator 48, the pulsed output signals of which are applied via the line 49 to the input circuits 21. Each signal pulse from the oscillator 48, as with each pulse in the signal pulses sent from a speed transducer, causes the microprocessor 20 to execute an interrupt program for speed and acceleration calculation. The speed is calculated as the number of speed pulses received during the interval between two pulses from the low-frequency oscillator 48, which corresponds to a time period of 0.5 seconds. The pulses from the low-frequency oscillator are hereinafter called time base pulses. The speed value thus represents a mean value for said time period. Acceleration is calculated as the difference between two sequentially calculated speed values. Whether the signal representing the engine load indicates a high or low value is registered for each time base pulse.

A program is stored in the PROM 28 for automatic gear selection. The program is illustrated in flow diagram form in FIG. 3. The gear selection program constitutes a part of a more extensive gear change program, which has gone through a plurality of control routines before reaching point 30 of FIG. 3. With the availability of manual override of the automatic gear change system, a routine is required to decide whether the operating means (manually operable gear lever 17) for manual gear selection has been actuated. The routine is represented by a block 31 illustrated in the figure. If the operating means is activated, the block 31 begins a count-down of a time register, e.g. 10 seconds. During this time, the driver may initiate the gear changing process as by depressing the clutch. If he does not, the system returns to automatic gear selection process which, according to the flow diagram, begins at a signal processing operation step 32, at which an acceleration value stored in an acceleration register by means of the interrupt program is read. In a subsequent comparing operation step 33, a determination is made as to whether the acceleration value exceeds a given retardation value (i.e. deceleration value) e.g. 5 m/s$^2$. If it does, e.g. as a result of wheel locking during braking, the program follows a flow path to operation step 35, at which a signal value representing the fact that the actual retardation value is greater than the given value is noted in a retardation notation register in the RAM 29. After step 35 there is an operation step denoted 36, where selection of neutral gear is made, the gear change program thereafter being terminated by an operation step 47, where the selected gear is indicated on the display unit.

Returning to step 33, if the predetermined retardation value is not exceeded, the program proceeds to a further comparing operation step 37 where it is determined whether a fault memory register in the RAM 29 has a value representing a fault in respect of the speed transducer stored therein, which can take place at a run-through of another part of the gear change program. When a speed error is stored in the fault memory, the program follows flow path 38 to step 36, where a neutral gear is selected. If a speed fault has not been detected, the program proceeds to step 39 where the system checks whether the signal indicating the fact that the actual retardation value is greater than the given value is still noted in the retardation notation register. If not, the program follows flow path 40 to block 46, representing a routine for the actual gear selection, and in a manner illustrated in FIG. 5. This routine uses the values of speed, acceleration and load obtained during the interrupt program (FIG. 4) for selection of a signal indicating the fact that the actual retardation value is greater than the given value remains in the retardation notation register, the program proceeds to a block 41 where it is determined, in a manner not described in more detail herein, if the vehicle wheel which was subjected to the great retardation has regained a stabilized state relative the substructure. If the wheel is still not stabilized, the program follows flow path 42 to block 47, where the neutral gear already selected in block 36 is registered and indicated as the recommended gear.

Figure 4:
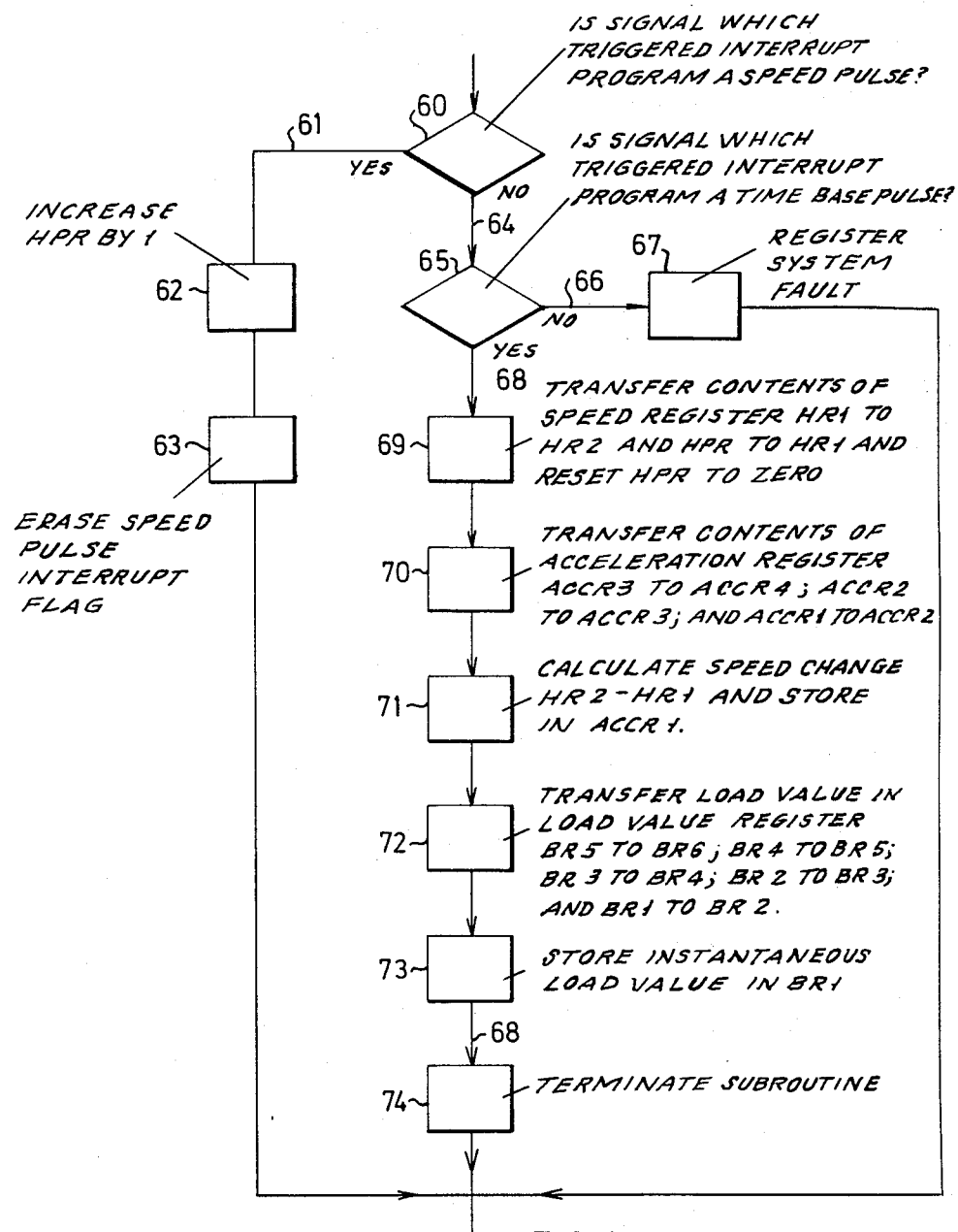
FIG. 4 is a flow diagram for a program relating to speed and acceleration calculation.

All the registers used in the description of the flow diagram constitute a part of the RAM 29 included in the system. In FIG. 4 there is illustrated a flow diagram of the program for carrying out the program for speed and acceleration calculation (the interrupt program noted above). In a comparing operation step 60, it is determined whether the signal which triggered the interrupt program is a speed pulse. If it is, the program follows the flow path 61 to a signal processing operation step 62, which ensures that the value stored in a speed pulse register HPR is increased by 1. The speed calculation routine is subsequently terminated at step 63 by erasing a notation made in the RAM 29, a so-called flag, relating to the interrupt routine for the speed pulse. Such a flag constitutes a command to the microprocessor 20 to interrupt the ordinary program and instead execute the speed calculation program (the interrupt program of FIG. 4).

If it is established at step 60 that the incoming interrupt pulse does not constitute a speed pulse, the program follows a flow path 64 to comparing operation step 65 where a determination is made whether the incoming pulse is a time base pulse from the low-frequency oscillator 48. If not, the program follows a flow path 66, where an operation step 67 ensures the registration of a system fault in a fault memory, subsequent to, which the interrupt routine is broken off. If it is established that the interrupt pulse constitutes a time base pulse, the program follows a flow path 68 to operation step 69 wherein the content in a first speed register, denoted HR 1, is transferred to a second speed register denoted HR 2, as well as the content to HPR to HPR 1. The operation step 69 is terminated by zeroing HPR.

In a subsequent operation step, the register content in an acceleration register denoted ACCR 3 is transferred to an acceleration register denoted ACCR 4. The register content in an acceleration register denoted ACCR 2 is thereafter transferred to the acceleration register ACCR 3 and finally, the content in an acceleration register denoted ACCR 1 is transferred to ACCR 2. In operation step 71 the acceleration is calculated, i.e. the difference between the contents of HR 1 and HR 2, which is then stored in ACCR 1.

The program then proceeds to operation step 72, in which transfer of a number of load values registered in a corresponding number of load registers BR 1–BR 5 is executed. Particularly, the content in a register BR 5 is transferred to register BR 6, the content in register BR 4 to register BR 5, the content in register BR 3 to register BR 4, the content in register BR 2 to register BR 3, and finally, the content in register BR 1 to register BR 2. Operation step 73 ensures storing of the instantaneous sensed load value in register BR 1, which represents either high or low engine load.

The interrupt program is terminated at operation step 74, not described in more detail here, in which reduction is executed in the appropriate time value register which is utilized for providing predetermined time lags.

Figure 3:
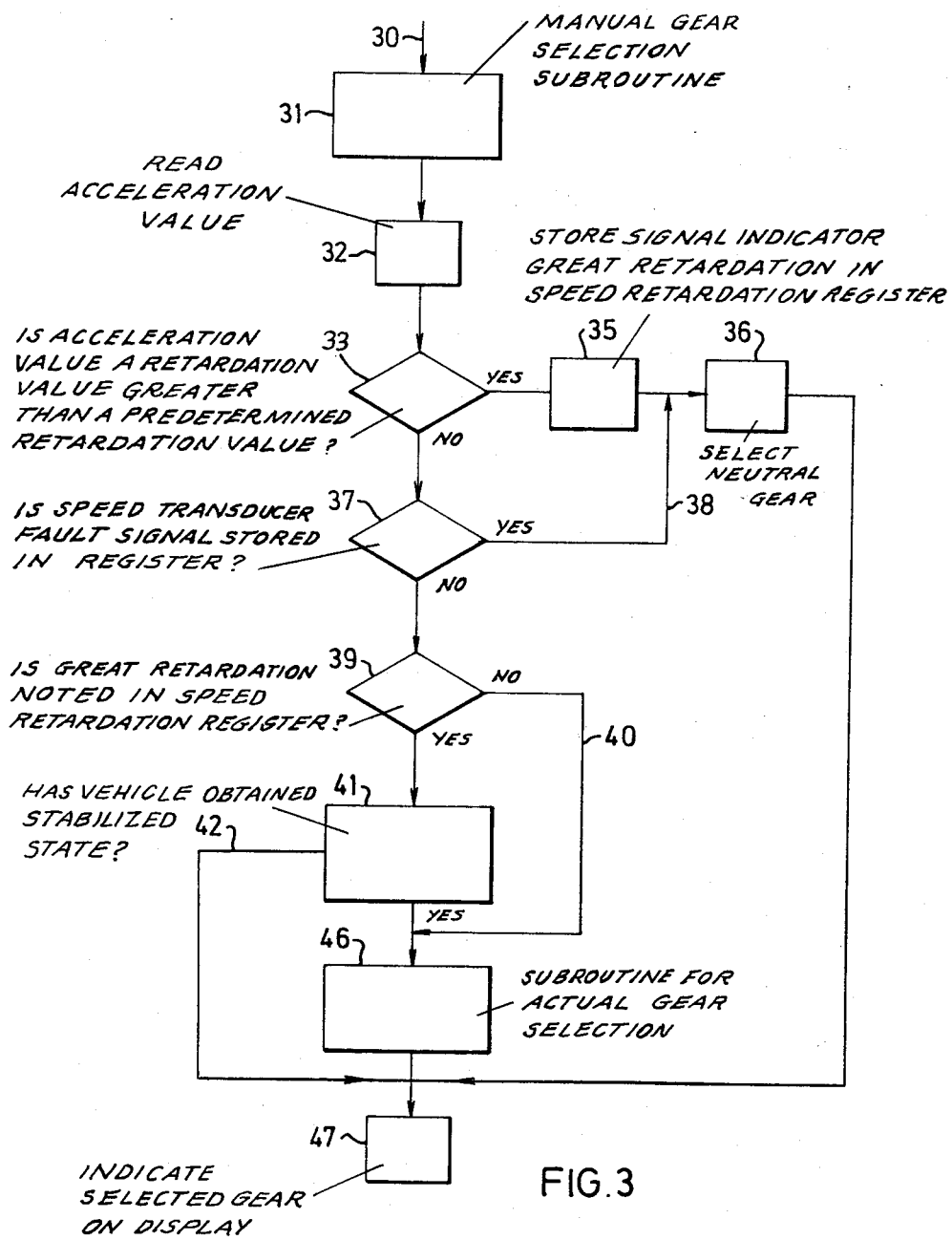
FIG. 3 is a flow diagram for the gear change program.
Figure 5:
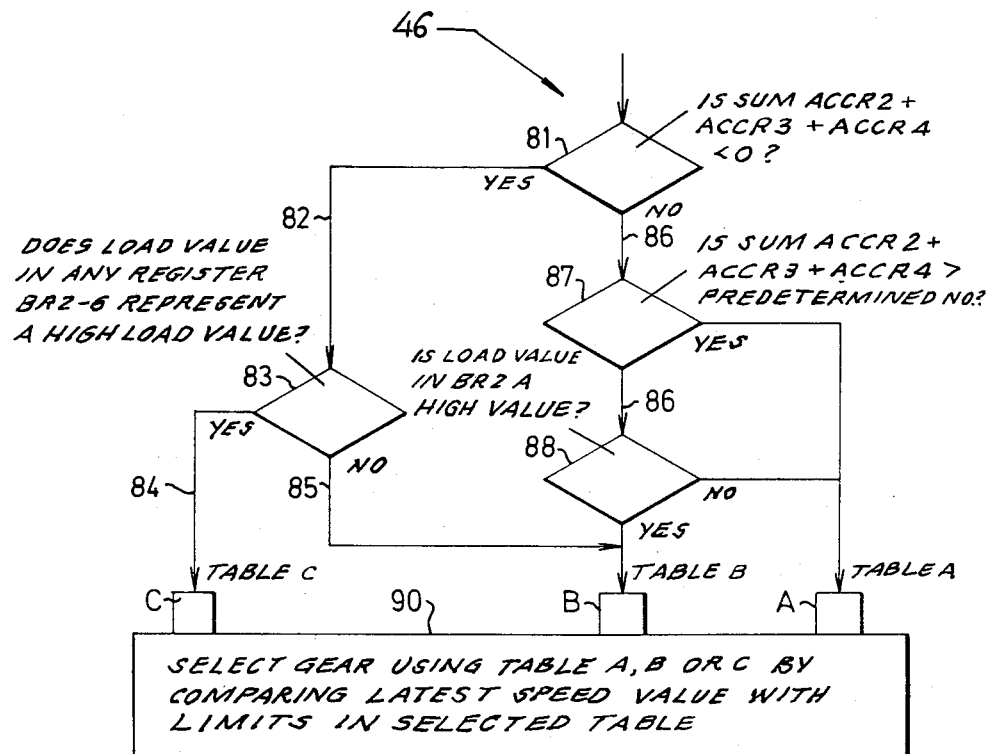
FIG. 5 is a flow diagram of the gear change routine.

A flow diagram illustrated in FIG. 5 for the gear selection routine (block 46) is referred to in FIG. 3 as the block 46. This block includes a comparing operation step 81, at which it is determined whether the sum of the contents in ACCR 2, ACCR 3 and ACCR 4 is less than zero. If this is the case, the program follows path 82 to a comparing operation step 83, where it is determined whether the content in any one of the load value registers BR 2-6 represents a high load value. If it does, the program follows flow path 84 to the selection of a suitable gear according to a table C stored in the PROM 28. On the other hand, if all the calculation registers BR indicate low load, the flow path 85 leads to selection according to a table B.

If it is found in the operation step 81 that the sum of the contents in ACR 2, 3 and 4 are not less than zero, the program follows flow path 86 to a comparing operation step 87, where it is determined whether the sum of the contents in ACCR 2, 3 and 4 is greater than a predetermined number, e.g. 8, representing the speed change 0.8 m/s². If so, the system chooses gear change points according to the speed limits which are given in table A.

If the sum is less than the predetermined number, the flow path 86 leads to a comparing operation step 88, in which it is determined whether the content in register BR 2 corresponds to a high load value. If it does, gear change points are chosen according to table B, and if the content in register BR 2 corresponds to a low load value, gear change points are chosen according to table A. In operation step 90, the gear is then selected by comparing the latest speed value with the speed limits in the chosen table. The selected gear is subsequently registered and indicated step 47, illustrated in FIG. 3.

By utilizing the average value for a number of registered past acceleration values and load values, there is avoided the effect of possible variations in sensed parameters immediately before a gear change process is initiated. A smooth gear selection has been achieved by utilizing parameter values relating to conditions prevailing at least 0.5 seconds ago.

The acceleration value utilized in step 81 and 87 for comparison with the limiting values stored in the PROM 28 should furthermore suitably be dependent on at least three separate acceleration values stored in the RAM 29. Similarly, for a well-functioning gear selection, the comparison made in step 83 with a limiting value stored in the PROM 28 should utilize at least three separate engine load values stored in the RAM 29.

What is claimed is:

1. A method for generating a gear selection signal in a vehicle having an engine, a mechanical power transmission which includes a plurality of gears, and a storage means for storing a plurality of gear selection tables, each said gear selection table including a respective upper and lower speed limit for each of said gears, said method comprising the steps of:

storing for each of a plurality of time intervals, a set of values representative of the speed of said vehicle, the acceleration of said vehicle, and the load of said engine during the respective time interval;

selecting one of said gear selection tables as a function of said stored values which relate to the engine load and acceleration of said vehicle at least 0.5 seconds before the most recently stored speed value; and generating a gear selection signal indicative of that gear whose respective upper and lower speed limits, as defined by said selected gear selection table, encompasses the most recently sensed speed value.

2. A method as claimed in claim 1, wherein said selecting step selects one of said gear selection tables as a function of at least three of said stored acceleration values, each of which relates to vehicle acceleration at a respective time interval which is at least 0.5 seconds before the most recently stored speed value.

3. A method as claimed in claim 1 or 2, wherein said selecting step selects one of said gear selection tables as a function of at least three of said stored engine load values, each of which relate to engine load at a respective time interval which is at least 0.5 seconds before the most recently stored value.

4. A method as claimed in claim 1, further including the step of providing a human perceptible indication of the gear indicated by said gear selection signal.

5. A method as claimed in claim 1, further including the step of inhibiting said gear generating step for a predetermined time interval in response to initiation of a manual gear selection process by a driver of said vehicle.

6. A method as claimed in claim 5, wherein said predetermined time interval is about 10 seconds.

7. A method for generating a gear selection signal in a vehicle having an engine, a mechanical power transmission including a plurality of gears, and a storage means for storing a plurality of gear selection tables, each said gear selection table including a respective upper and lower speed limit for each of said gears, said method comprising the steps of:
sensing, during each of a plurality of successive time intervals, a speed value of said vehicle, and a load value of said engine and storing said sensed values;
calculating for each said time interval an acceleration value of said vehicle as a function of said sensed speed value associated with that time interval and said sensed speed value associated with the prior said time interval;
selecting one of said gear selection tables as a function of said stored load and acceleration values which values are associated with at least one of said time intervals which will relate to engine load and vehicle acceleration at least 0.5 seconds before the most recent said time interval; and
generating a gear selection signal indicative of that gear whose respective upper and lower speed limits, as defined by said selected gear selection table, encompasses the most recently sensed speed value.

8. A method as claimed in claim 7, wherein said selecting step selects one of said gear selection tables as a function of at least three of said stored acceleration values, each of which relates to vehicle acceleration at a respective time interval which is at least 0.5 seconds before the most recent said time interval.

9. A method as claimed in claim 7 or 8, wherein said selecting step selects one of said gear selection tables as a function of at least three of said stored engine load values, each of which relate to engine load at a respective time interval which is at least 0.5 seconds before the most recent said time interval.

10. A method as claimed in claim 7, further including the step of providing a human perceptible indication of the gear indicated by said gear selection signal.

11. A method as claimed in claim 7, further including the step of inhibiting said generating step for a predetermined time interval in response to initiation of a manual gear selection process by a driver of said vehicle.

12. A method as claimed in claim 11, wherein said predetermined time period is about 10 seconds.

* * * * *